US010662090B2

(12) United States Patent
Lopez et al.

(10) Patent No.: US 10,662,090 B2
(45) Date of Patent: May 26, 2020

(54) ELECTROLYTIC TREATER AND METHOD FOR TREATING WATER

(71) Applicants: Noe Joshua Lopez, Dallas, TX (US); Wade Decker, Cedar Hill, TX (US)

(72) Inventors: Noe Joshua Lopez, Dallas, TX (US); Wade Decker, Cedar Hill, TX (US)

(*) Notice: Subject to any disclaimer, the term of this patent is extended or adjusted under 35 U.S.C. 154(b) by 15 days.

(21) Appl. No.: 16/044,632

(22) Filed: Jul. 25, 2018

(65) Prior Publication Data

US 2018/0327286 A1    Nov. 15, 2018

Related U.S. Application Data

(63) Continuation-in-part of application No. PCT/US2017/014887, filed on Jan. 25, 2017.

(60) Provisional application No. 62/289,110, filed on Jan. 29, 2016.

(51) Int. Cl.
    *C02F 1/461* (2006.01)
    *C02F 1/66* (2006.01)

(52) U.S. Cl.
    CPC ........ *C02F 1/4618* (2013.01); *C02F 1/46109* (2013.01); *C02F 1/66* (2013.01); *C02F 2001/46138* (2013.01); *C02F 2001/46152* (2013.01); *C02F 2001/46195* (2013.01); *C02F 2201/4611* (2013.01); *C02F 2201/4614* (2013.01); *C02F 2201/4617* (2013.01); *C02F 2201/4618* (2013.01); *C02F 2201/46135* (2013.01); *C02F 2209/04* (2013.01); *C02F 2209/06* (2013.01)

(58) Field of Classification Search
    None
    See application file for complete search history.

(56) References Cited

U.S. PATENT DOCUMENTS

| | | | |
|---|---|---|---|
| 4,680,100 A * | 7/1987 | Morin | C25B 11/02 204/242 |
| 6,139,714 A * | 10/2000 | Livshits | C02F 1/4618 204/263 |
| 6,235,186 B1 * | 5/2001 | Tanaka | C02F 1/46109 204/253 |
| 2013/0220829 A1 * | 8/2013 | Rigby | C02F 1/46104 205/744 |
| 2015/0315043 A1 * | 11/2015 | Servida | C02F 1/46114 204/536 |

* cited by examiner

*Primary Examiner* — Salil Jain
(74) *Attorney, Agent, or Firm* — John R Casperson

(57) ABSTRACT

One embodiment of the invention provides an electrolytic treatment unit comprising a casing, a plate bundle, a cathode and an anode. The casing has a longitudinal axis. The plate bundle is positioned in the casing. The plate bundle comprises a plurality of spaced-apart parallel plates and each plate is positioned normal to the longitudinal axis. The cathode or anode are connected to selected plates of the bundle. Another embodiment of the invention provides an electrolytic treatment unit comprising a casing, a baffle separating the casing into first and second compartment, and a plate bundle positioned in each compartment. A cathode is connected to one bundle and an anode to the other bundle. A product stream is taken from each compartment. To achieve needed throughput at low head, the plates are spaced in the range of 1 cm to 10 cm apart.

5 Claims, 6 Drawing Sheets

ELECTROLYTIC TREATER AND METHOD FOR TREATING WATER

TECHNICAL FIELD

One embodiment of this invention relates to an electrolytic water treater. Another embodiment of this invention relates to an electrolytic method to treat water.

BACKGROUND ART

The capacity of water to hydrate cells is dependent on its pH, minerals content and molecular structure. Small-volume electrolytic processes to favorably influence these parameters are known. Most produce acidic wastewater streams. We have found an electrolytic process with high enough throughput to be economically viable for farming and dairy operations that does not produce a wastewater stream. We have found another electrolytic process that produces high volumes of both alkaline and acid streams that has good flexibility for adaptation to different operations.

DISCLOSURE OF THE INVENTION

In one embodiment of the invention, there is provided an electrolytic water treater comprising a casing, a plate bundle, and a pair of electrodes. The plate bundle is positioned in the casing. The plate bundle comprises a plurality of spaced-apart parallel plates. The pair of electrodes help support the plurality of plates, which are suspended in the casing. The electrodes are connected to the plates so that individual plates are connected to one of a first electrode of the pair or a second electrode of the pair and are uncontacted by the other electrode.

In a preferred embodiment, the plates are separated and arranged so that water can flow through the treater at from 5 to 50 gallons per minute 18.9 to 189 L/min) at low head. To achieve this, separation between the plates preferably ranges about 1 cm to about 10 cm. For operation, a rectifier provides DC electrical current to the plates. The DC current is typically provided at between 6 and 12 volts, at an amperage in the range of from about 5 to 50 amps, depending on water flow. The water has a residence time between the plates of from about 3 seconds to about 30 seconds.

Water treated by the unit is basified and softened and the structure of the water is comminuted, or microclustered. The water preferably develops a negative oxidation-reduction potential (negative ORP), preferably −600 mV or more negative. It is made tastier for livestock such as dairy cattle, and they drink more and are hydrated better. They produce more milk, and it has a higher fat content.

Another embodiment of the invention provides a method for electrotreating water that can be carried out in the above described treater. The method is carried out by providing a feed water stream comprising dissolved minerals, flowing the feed water stream between spaced metal plates, flowing an electric current though the water stream flowing between the plates; and withdrawing a treated water stream from between the plates.

In another embodiment of the invention, an electrolytic treatment unit comprises a casing, a baffle, a first plate bundle, a second plate bundle, a cathode, an anode, an inlet, a first outlet, and a second outlet. The baffle separates the casing into a first compartment and a second compartment. The first plate bundle comprises a plurality of parallel spaced-apart plates positioned in the first compartment. The second plate bundle comprises a plurality of parallel spaced-apart plates positioned in the second compartment. The cathode is electrically connected to the plates of the first plate bundle. The anode is electrically connected to the plates of the second plate bundle. The inlet is to supply water to be treated to the first compartment and the second compartment. The first outlet is to withdraw treated water from the first compartment. The second outlet is to withdraw treated water from the second compartment.

Another embodiment of the invention provides a method for adjusting the pH of water. The method comprises providing a feed water stream at a first pH comprising dissolved minerals, flowing the feed water stream into a lower part of a casing. The casing carries a baffle, a first plate bundle, and a second plate bundle. The baffle separates the casing into a first compartment and a second compartment. The first plate bundle comprises a plurality of parallel spaced-apart plates positioned in the first compartment and the second plate bundle comprises a plurality of parallel spaced-apart plates positioned in the second compartment. A cathode is electrically connected to the plates of the first plate bundle, and an anode is electrically connected to the plates of the second plate bundle. The casing has a first outlet to withdraw treated water from the first compartment and a second outlet to withdraw treated water from the second compartment. A first portion of the feed water is flowed across the plates of the first plate bundle and the first portion of water is withdrawn from the first outlet. A second portion of the feed water is flowed across the plates of the second plate bundle and withdrawing the second portion of the feed water is withdrawn from the second outlet. An electric current from the cathode to the anode to adjust the pH of the first portion and the second portion of the feed water.

BEST MODE FOR CARRYING OUT THE INVENTION

Figure 1:
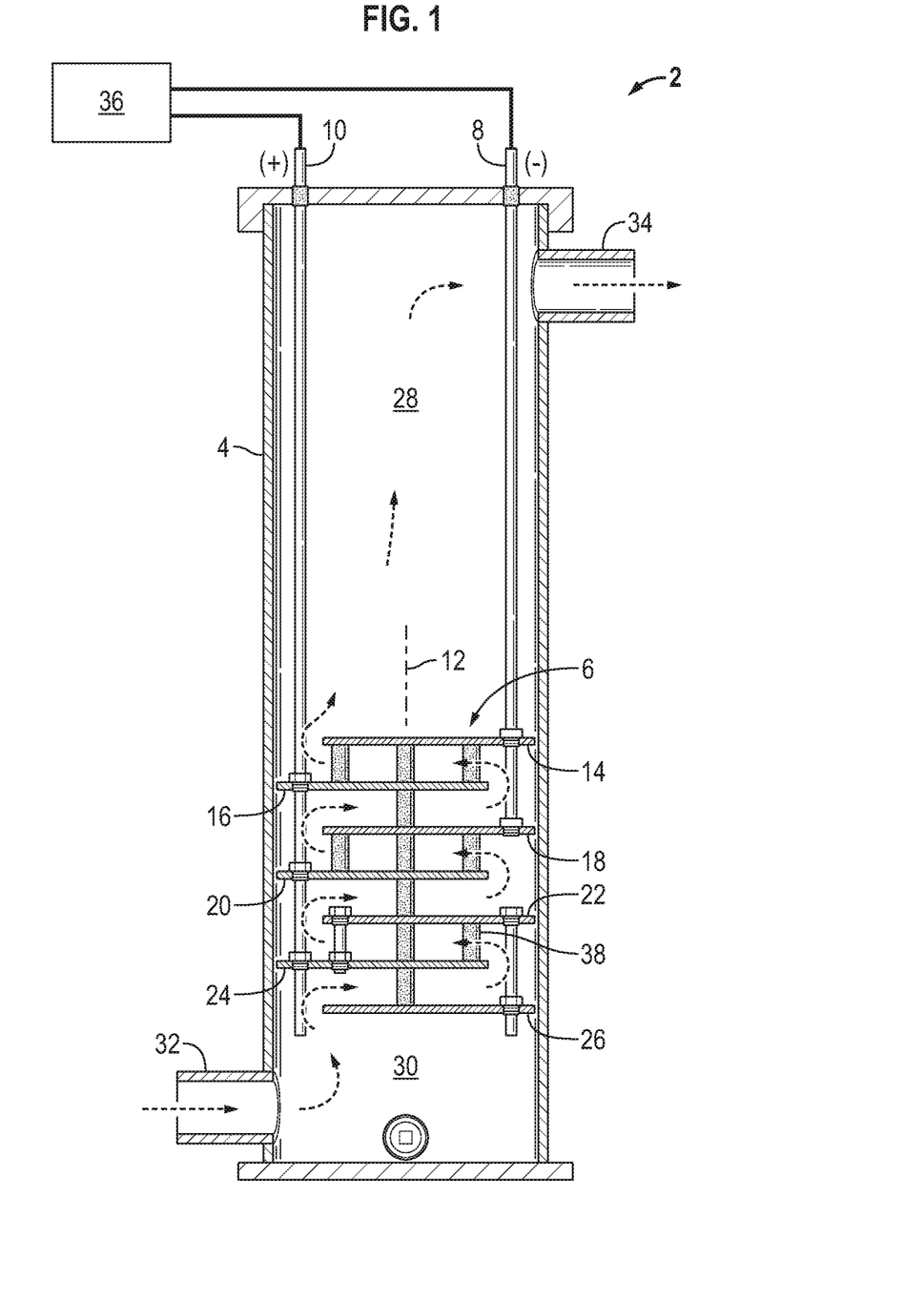
FIG. 1 is a cross-sectional view, partly in schematic, of an electrolytic water treater in accordance with an embodiment of the invention.

One embodiment of the invention provides an electrolytic treatment unit 2 comprising a casing 4, a plate bundle 6, a cathode 8 and an anode 10. The casing has a longitudinal axis 12. The plate bundle is positioned in the casing. The plate bundle comprises a plurality of spaced-apart parallel plates, 14, 16, 18, 20, 22, 24 and 26 in the embodiment illustrated, and each plate is positioned normal to the longitudinal axis. A pair of electrodes comprising the cathode and the anode at least partially support the plurality of parallel plates. The electrodes are connected to the plates so that each plate is connected to one of the cathode or the anode and is uncontacted by the other electrode. To achieve needed throughput at low head, the plates are spaced in the range of 1 cm to 10 cm apart.

The casing has an upper end and a lower end and the plate bundle is spaced apart from the upper and lower ends of the casing to form upper and lower chambers 28 and 30. The casing further defining an inlet nozzle 32 opening into the lower chamber and an outlet nozzle 34 exhausting from the upper chamber.

A power supply 36 supplies low-voltage DC current of at least 4V to the electrodes. The upper-most plate 14 in the bundle is attached to the cathode 8.

The plate bundle has a longitudinal axis positioned co-axially with the longitudinal axis of the casing and the plates extending normally across the longitudinal axis of the bundle, The plates have arcuate peripheries located closely adjacent to an inside wall of the casing and extending alongside the inside wall around the casing to direct water flow. The bundle can be described as having an upper half and a lower half with a greater number of cathode plates in the upper half and a greater number of anode plates in the lower half. Water flow upward through the unit, flowing an undulating path.

In one embodiment, the plate bundle comprises first plates and second plates positioned in 180 degree rotationally alternating fashion along the plate bundle. Each first plate has an arcuate outer periphery portion positioned closely adjacent to the inside wall of the casing and a straight outer periphery portion defining a first circular-segment-shaped flow passage between the each first plate and the casing, and each second plate has an arcuate outer periphery portion positioned closely adjacent to the inside wall of the casing and a straight outer periphery portion defining a second circular-segment-shaped portion between each second plate and the casing. The first circular-segment-shaped passages are diametrically opposite to the second circular-shaped passages with respect to the longitudinal axis of the tube bundle so that fluid flowing from the lower chamber to the upper chamber sweeps back and forth between the first and second plates as it flows from the lower chamber to the upper chamber. The plates can be of identical shape if desired. The casing is preferably formed of dielectric material to not short out the plates. Preferably, the casing is generally cylindrical and is formed from hi-temp C PVC. The tie rods are dielectric and preferably formed from neoprene. The electrodes are conductive and are preferably formed from stainless steel. The dielectric bushings are constructed of PVC.

A plurality of dielectric tie rods extending through the plates and a plurality of dielectric spacers 38 are mounted on the tie rods between the plates to position the plates in a stacked, spaced-apart relationship.

The pair of electrodes consists of a first electrode and a second electrode. The first electrode passes through a first circular-segment shaped flow passage and connects to second plates 14, 18. The second electrode passes through a second circular-segment-shaped flow passages and connects to first plates 16, 20, 24. Preferably, the plurality of plates is formed from platinum or titanium coated on titanium alloy. More preferably, at least two of the plurality of plates comprise platinum electrocoated on titanium alloy. Most preferably, each plate comprising platinum electrocoated on titanium alloy is connected to the cathode. Even more preferably, the top-most plate 14 in the bundle comprises platinum electrocoated on titanium alloy. In an embodiment of the invention that has been tested with good results, the casing has an inside volume of about 17 gallons and the bundle consists of 7 plates, the first and third plates from the top being the sole cathodic plates in the unit.

In one embodiment of the invention, the power supply is programmable to switch polarity between the first electrode to the second electrode.

Figure 2:
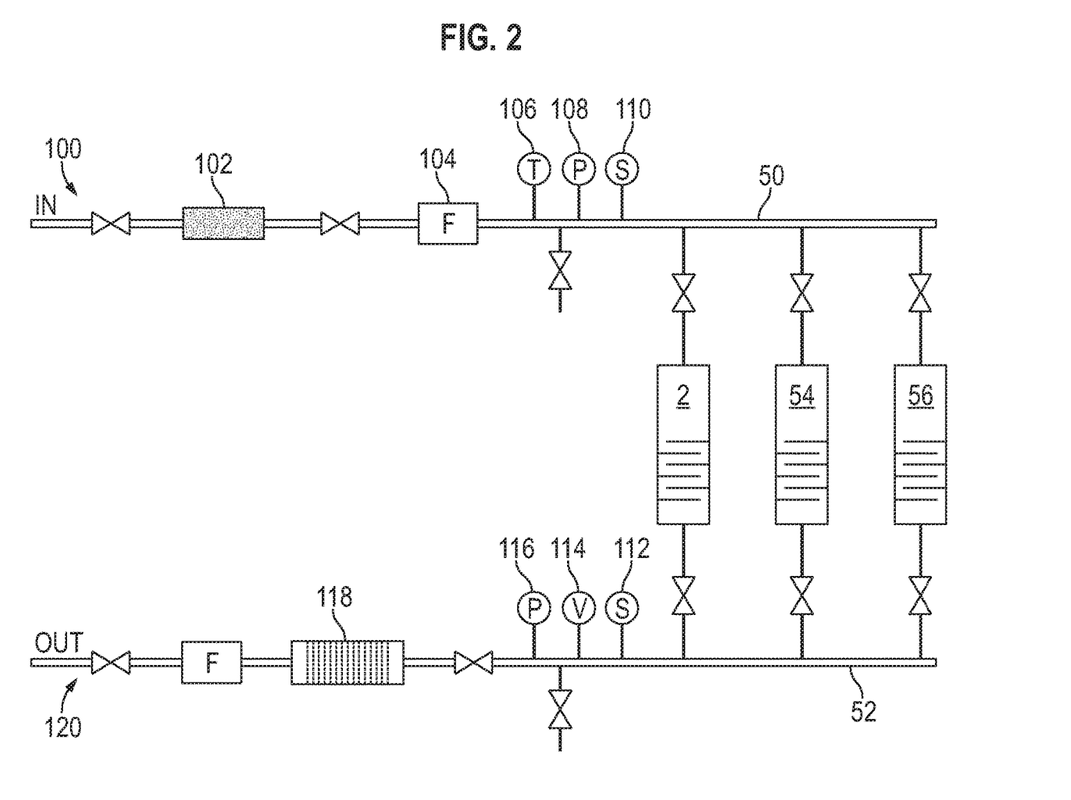
FIG. 2 is a flow diagram of a water treatment system in accordance with another embodiment of the invention.

With reference to FIG. 2, the treatment unit 2 can have its inlet nozzle connected to an inlet manifold 50 and its outlet nozzle connected to an exhaust manifold 52. A second electrolytic treatment unit 54 which can be the same as previously described can be connected to the inlet manifold and exhaust manifold in parallel to the first electrolytic treatment unit. In similar fashion, a third electrolytic treatment unit 56 can be connected to the inlet manifold and the exhaust manifold in parallel to the first electrolytic treatment unit and the second electrolytic treatment unit. These additional units can be brought on line as needed to satisfy increased demand. Preferably, each unit has a maximum capacity of about 50 gallons per minute (189 L/min).

Another embodiment of the invention provides a method for adjusting the pH of water. The method is carried out on a feed water stream comprising dissolved minerals and having a first pH. The feed water stream is flowed between at least one pair of a first metal plate spaced parallel to a second metal plate. An electric current is flowed though the water stream from the first plate to the second plate. A treated water stream having a second pH is withdrawn from between the plates at a flow rate in the range of from about 2 to about 200 gallons per minute (7.6 to 760 L/min). The method produces no waste water stream. In a preferred embodiment, the feed water stream flows between the plates for a period of time in the range of 1 to 60 seconds and an electric potential in the range of 4 to 14 volts is maintained between the electrodes. More preferably, a potential in the range of 6-12 volts is maintained between the electrodes and an electric current in the range of 10 to 50 amps flows between the electrodes. The treated water stream is generally withdrawn from between the plates at a flow rate in the range of from about 5 to about 100 gallons per minute (18.9 to 379 L/min), usually in the range of from about 10 to about 50 gallons per minute (37.9 to 189 L/min). Based on flow, roughly about 1 amp is used for each gallon per minute of throughput (0.265 amp/L/min).

The feed water is preferably flowed back and forth between a plurality of at least 6 spaced apart horizontal metal plates arranged in a substantially vertical stack within a casing. There are preferably more anodic plates than cathodic plates in a bottom half of the stack and more cathodic plates than anodic plates in a top half of the stack.

The water is preferably treated so that the second pH is at least one point higher than the first pH, preferably at least 1.5 points higher than the first pH. The treated water preferably has a second pH of at least 8 and the treated water is microclustered in units averaging in the range of 5 to 7 molecules. Generally speaking, the water to be treated will have a first pH in the range of about 6 to about 7.7 and the treated water at the second pH is in the range of about 7.8 to about 9.8, preferably in the range of about 7.8 to about 8.8 The treated water will preferably have a negative oxidation-reduction potential (mV) of −600 (−ORP) or more negative.

In the treatment unit, the plurality of plates consists of a stack of cathodic plates and anodic plates and at least a portion of the cathodic plates preferably have a platinum surface. The stack of plates is dividable into roughly an upper half and a lower half with more cathodic plates than anodic plates in the upper half and more anodic plates than cathodic plates in the lower half. Plates constructed primarily of titanium or titanium alloy have been used with good results. The uppermost plate being a cathodic plate has been used with good results.

In one embodiment of the invention, freshly treated water is provided to dairy cattle. This embodiment can be described in terms of the withdrawn stream being provided in at least one receptacle for consumption by a plurality N of dairy cattle. In aggregate, the at least one receptacle is sized in gallons no greater than 50 N, (189 N in L) preferably no greater than 25 N, (95 N in L) and more preferably no greater than 10 N (38 N in L). Holstein dairy cattle typically drink from 20 to 40 gallons (76 to 151 L) of water per day, depending on temperature.

The invention solves the problem of not having high volumes of high pH, microclustered water available for farm and dairy operations. It can also be used to provide such water for human consumption. It can also be used to soften large volumes of water from fresh water wells.

Figure 3:
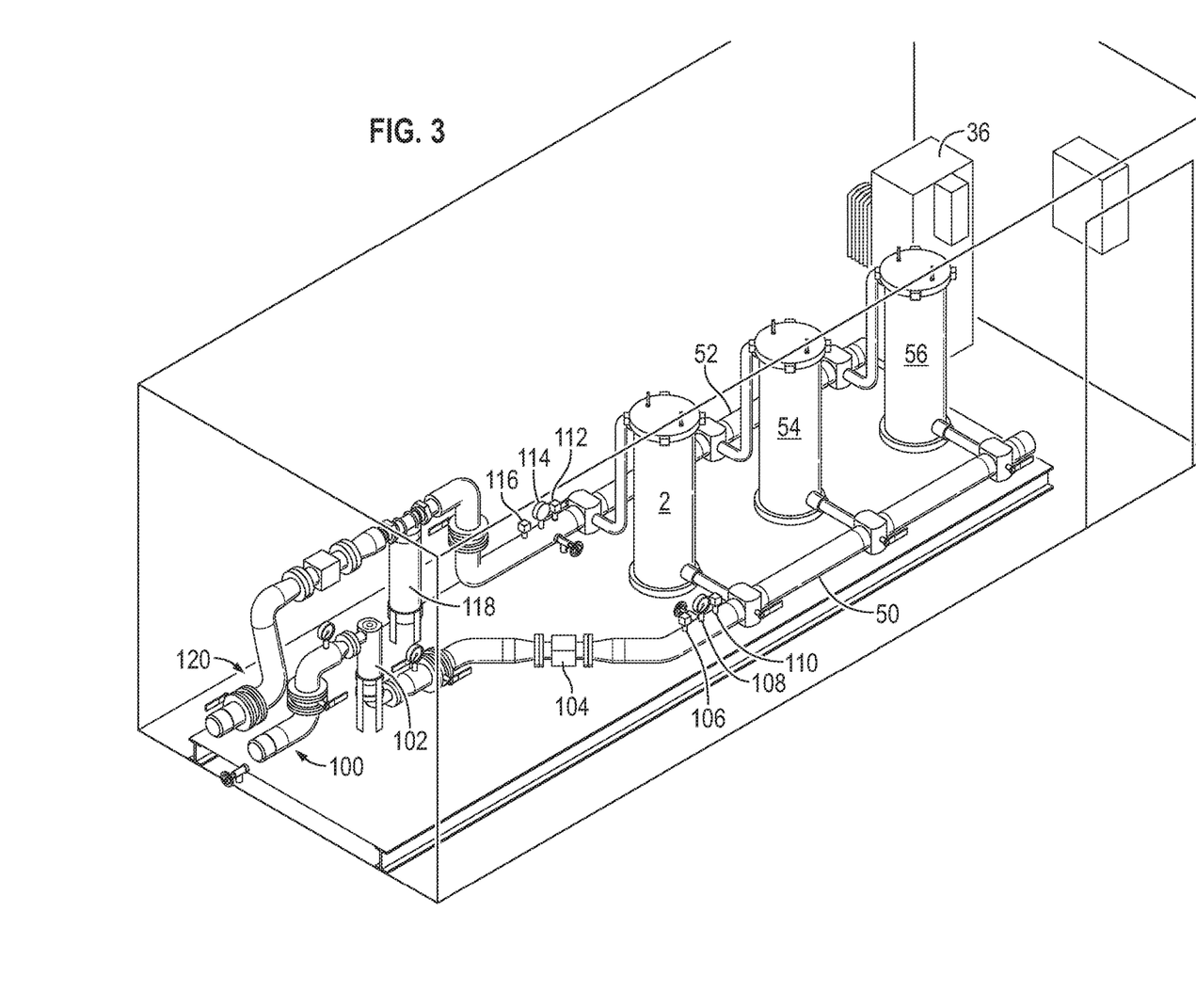
FIG. 3 is a perspective view of a trailer-mounted water treatment system in accordance with another embodiment of the invention.

With reference to FIG. 3, untreated water enters the unit through a 2 to 4 inch (5.1 to 10.2 cm) stainless steel pipe 100. A filter pod or solids separator 102 is used to reduce the amount of solids contained in the water to be treated. Sensors 104, 106, 108, 110 measure flow, total dissolved solids, temperature and pH of the stream to be treated. The water is divided by header 50 and treated in treatment units 2, 54 and 56. A DC power converter (rectifier) 36 provides electrical power to the plates in the treatment units. Treated water is collected by outlet manifold 52 and analyzed by sensors 112, 114, 116 for pH, ORP and total dissolved solids. The treated water is passed through finishing filter 118 and is withdrawn from the unit at 120 ready for consumption by livestock or other use such as horticulture, household or industrial use.

As applied to livestock and dairy operations, the invention provides a multi-benefits approach to animal health through water microclustering and increased pH. In an exemplary application the water has its ORP, as measured in mV, reduced from the +100 to +200 range to the −600 to −700 range and its pH is increased from near-neutral to in the range of 7.8 to 9.8

The water treatment can be performed on-site and with variable volumes, up to 150 gallons/minute (568 L/min) by a pump not shown.

Example 1

This example shows the effects on water properties of treatment according to an embodiment of the invention. The samples were taken a few weeks apart.

TABLE

| Analyzed for | no treatment | treated | method used |
| --- | --- | --- | --- |
| pH | 7.6 s.u. | 9.7 s.u. | SM 4500 H.B. |
| conductivity | 0.49 mmhos/cm | 0.24 mmhos/cm | SM 2510 B |
| dissolved solids (calc) | 324 mg/L | 154 mg/L | SM 1030F |
| carbonate | <1 mg/L | <1 mg/L | SM 2320B |
| bicarbonate | 248 mg/L | <1 mg/L | SM 2320B |
| alkalinity (as CaCO3) | 203 mg/L | 17 mg/L | SM 2320B |
| calcium | 50 mg/L | 9 mg/L | SM 3120B |
| magnesium | 17 mg/L | 3 mg/L | SM 3120B |
| potassium | 11 mg/L | 10 mg/L | SM 3120B |
| sodium | 18 mg/L | 17 mg/L | SM 3120B |
| sulfur (total) | 8.80 mg/L | 8.60 mg/L | SM 3120B |
| chloride | 7.00 mg/L | 8.00 mg/L | SM 4500 CE |
| iron | <0.01 mg/L | <0.01 mg/L | SM 3120B |

TABLE-continued

| Analyzed for | no treatment | treated | method used |
| --- | --- | --- | --- |
| manganese | <0.01 mg/L | <0.01 mg/L | SM 3120B |
| Total hardness as CaCO3 | 11.38 grains/gal | 2.03 grains/gal | SM 2340B |

The table shows that treatment increases pH, reduces conductivity, reduces dissolved solids, greatly reduces bicarbonate, reduces alkalinity as measured by CaCO3, reduces calcium and magnesium, and greatly reduces total hardness as measured by combined Ca+Mg as CaCO3 from a very hard state to a soft state.

Example 2

This is an account and report from Indian Ridge Dairy in Comanche Tex.

Treatment with the inventive water treatment equipment was commenced on May 1, 2016 in dairy pens of #1 and #5 and continued until Nov. 10, 2016. Pen #4 was a control pen, water not treated from the May 1, 2016 until Nov. 10, 2016.

Milk production was tracked in the three pens, using a standardized measurement called 305 ME. This stands for 305 days in milk—mature equivalent. This standardizes a cow's performance throughout her lactation, meaning from day 1 milk to ending milk and everything in between. In other words it is one of the only measurement's we can use to standardize cattle performance because there are so many variables.

1. Dairy Cows in Pen #4 started May $1^{st}$ at 27,500 lbs. (12474 kg)—305ME. Ending test on September $6^{th}$ at 25,000 lbs. (11340 kg) respectfully. (Control group)
2. Dairy Cows in Pen #1 started May $1^{st}$ at 27,500 lbs. (12474 kg)—305ME. Ending test on September $6^{th}$ at 26,850 lbs. (12179 kg) respectfully. (Treated Group)
3. Dairy Cows in Pen #5 started May $1^{st}$ at 27,600 lbs. (12519 kg)—305ME. Ending test on September $6^{th}$ at 26,350 lbs. (11998 kg) respectfully. (Treated Group)

In conclusion, it appears that Pens #1 and #5 which were treated with the inventive equipment gave an additional 1,350 to 1,850 lbs. (612 to 839 kg) of 305ME milk compared to the control Pen #4 in the same time period.

Additional Embodiments

Figure 4:
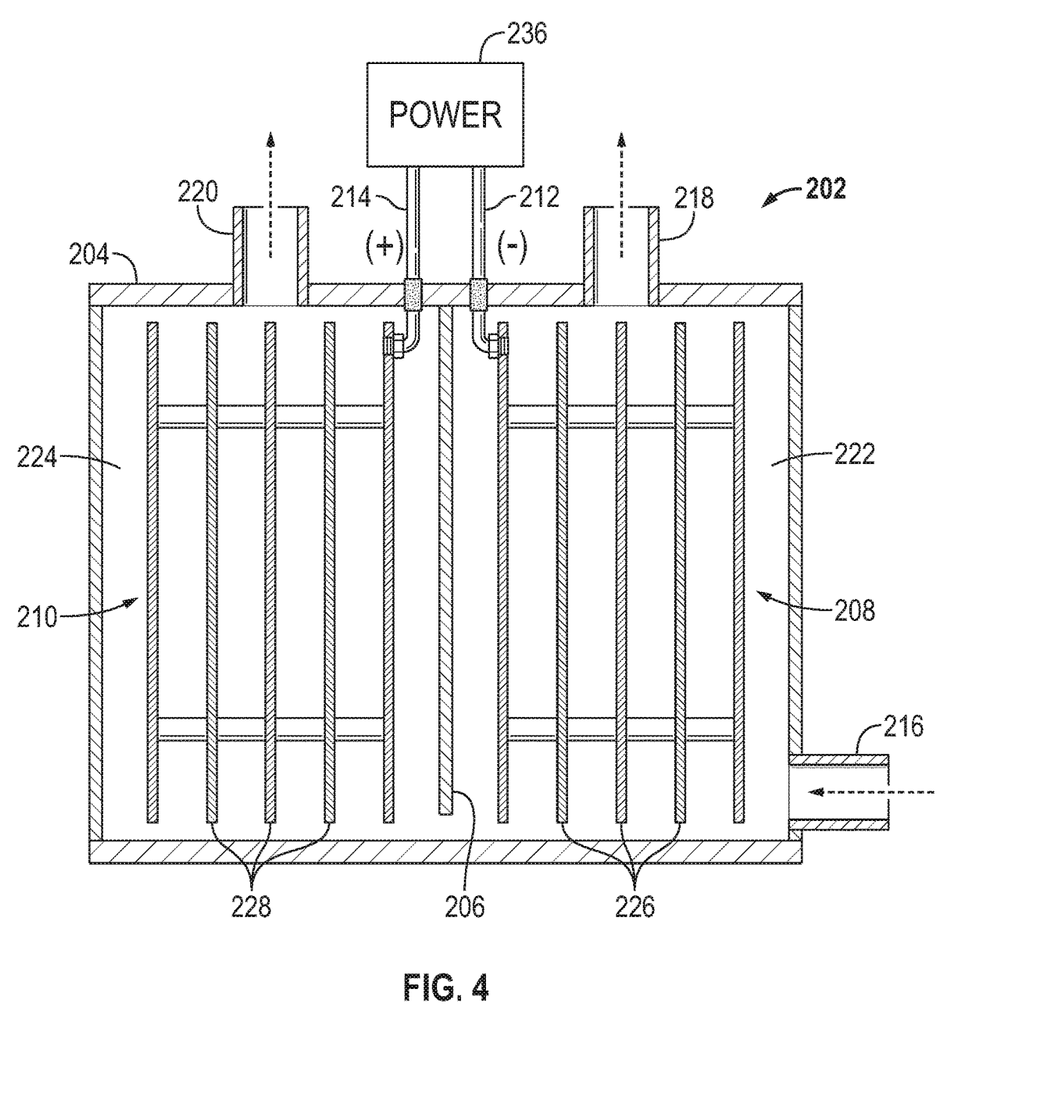
FIG. 4 is a cross-sectional view, partly in schematic, of an electrolytic water treater in accordance with another embodiment of the invention.

In another embodiment of the invention, and as best shown in FIG. 4, an electrolytic treatment unit 202 comprises a casing 204, a baffle 206, a first plate bundle 208, a second plate bundle 210, a cathode 212, an anode 214, an inlet 216, a first outlet 218, and a second outlet 220. The baffle separates the casing into a first compartment 222 and a second compartment 224. The first plate bundle comprises a plurality of parallel spaced-apart plates 226 positioned in the first compartment. The second plate bundle comprises a plurality of parallel spaced-apart plates 228 positioned in the second compartment. The cathode is electrically connected to the plates of the first plate bundle. The anode is electrically connected to the plates of the second plate bundle. The inlet is to supply water to be treated to the first compartment and the second compartment. The first outlet is to withdraw treated water from the first compartment. The second outlet is to withdraw treated water from the second compartment. A power supply 236 supplies low-voltage DC current of at least 4V to the unit.

In one embodiment of the invention, the parallel plates in the first plate bundle have platinum or titanium surfaces and the parallel plates in the second plate bundle have titanium, iron or aluminum surfaces. For example, the parallel plates in the first plate bundle can have platinum surfaces and the parallel plates in the second plate bundle can have titanium surfaces.

In a preferred embodiment of the invention, the parallel plates are vertically positioned and are spaced in the range of about 1 cm to about 10 cm apart. Each plate bundle comprises in the range of 3 to 15 plates. For a rectilinear casing, the plates are preferably rectangularly shaped. The inlet is typically in a lower part of the casing, and the first and second outlets are in the top of the casing, one for each chamber. Water can flow around and/or through the baffle, or baffle system. The baffle is preferably formed from a conductive material, whereas the casing is formed from a dielectric material, or is lined with a dielectric material.

A preferred embodiment of the invention employs parallel electrolytic treatment units in an electrolytic treatment system 300. See FIG. 5. The system includes an inlet manifold 350, a first exhaust manifold 352, a second exhaust manifold 354 and first and second electrolytic treatment units 301, 302. The inlet manifold is connected to the inlet nozzle of the first unit. The first exhaust manifold is connected to the first outlet of the first electrolytic treatment unit and the second exhaust manifold is connected to the second outlet of the first electrolytic treatment unit. The second electrolytic treatment unit is identical to the first unit and is connected to the inlet manifold, the first exhaust manifold, and the second exhaust manifold in parallel to the first electrolytic treatment unit. As many units as desired can be connected to the manifolds in parallel. Preferably, the system further includes means 360 forming a flow path connecting the first exhaust manifold and the second exhaust manifold. The means can include a valve 362 and a pump 364 to regulate flow, as well as sensors (for example, pH and flow) to provide feedback.

Figure 5:
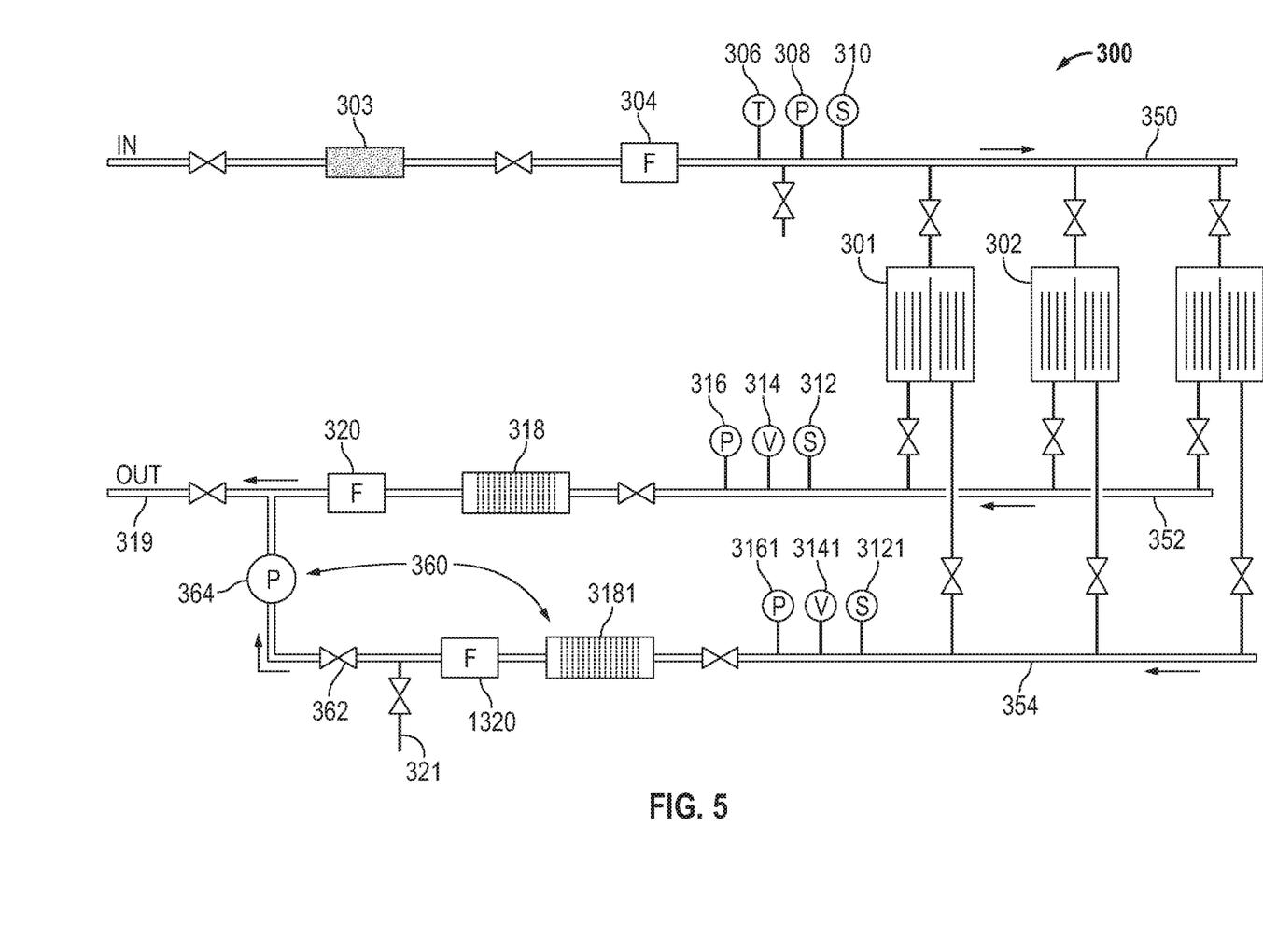
FIG. 5 is a flow diagram of a water treatment system in accordance with another embodiment of the invention.

In the system shown, a filter pod or solids separator 303 is used to reduce the amounts of solids contained in the water to be treated. Sensors 304, 306, 308, 310 measure flow, total dissolved solids, temperature and pH of the stream to be treated. The water is divided by header 350 and treated in treatment units 301, 302. Treated water is collected by outlet manifolds 352, 354 and analyzed by sensors 312, 314, 316, 320 for pH, ORP and total dissolved solids and flow rate in outlet manifold 352 and by sensors 3121, 3141, 3161 and 1320 for pH, ORP, total dissolved solids, and flow in outlet manifold 354. The treated water is passed through finishing filters 318, 3181 and is withdrawn from the unit at 319, 321 ready for consumption by livestock or other use such as horticulture, household or industrial use.

Figure 6:
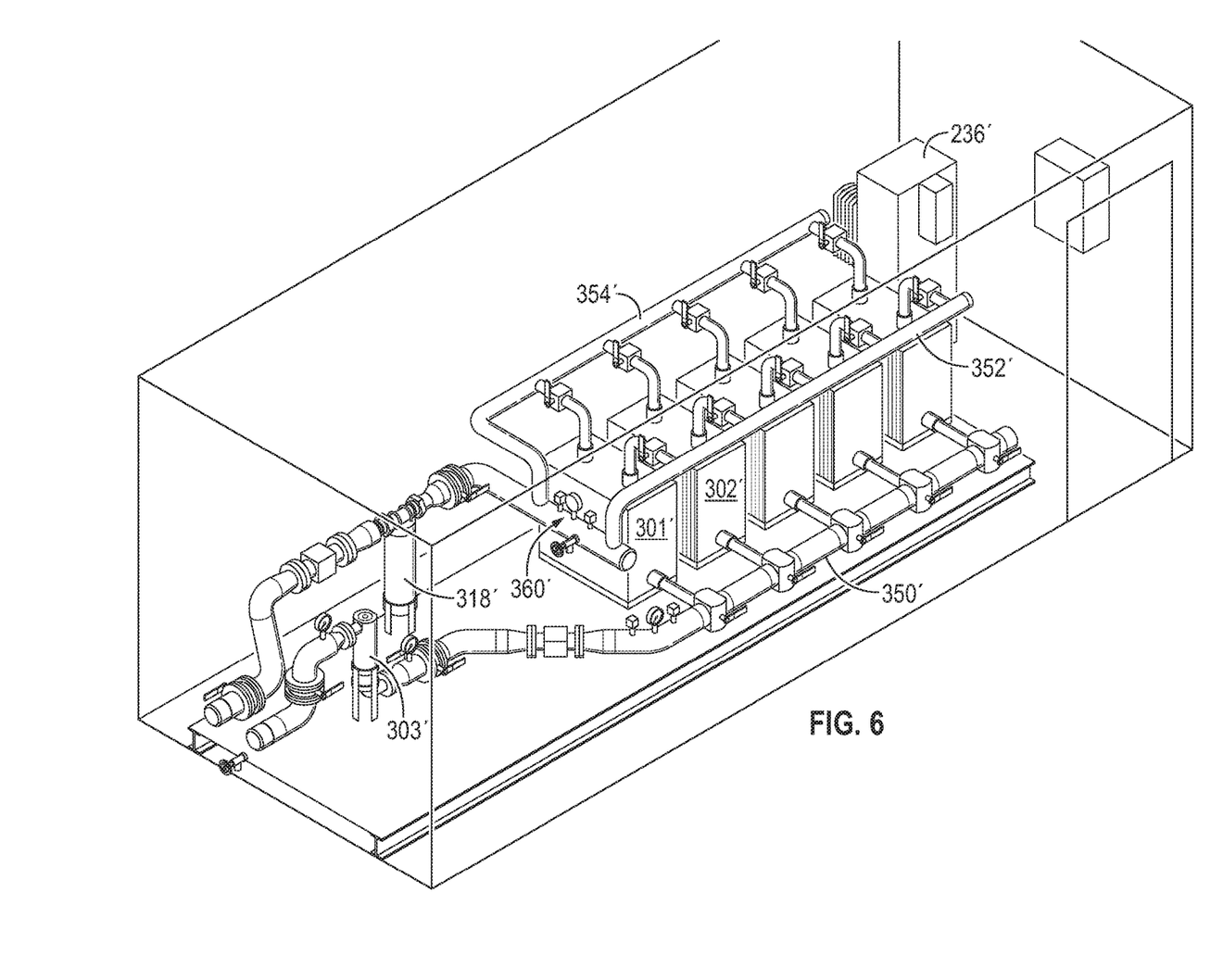
FIG. 6 is a perspective view of a trailer-mounted water treatment system in accordance with another embodiment of the invention.

A trailer or skid mounted embodiment of the invention is shown in FIG. 6. The system includes an inlet manifold 350', a first exhaust manifold 352', a second exhaust manifold 354' and first and second electrolytic treatment units 301', 302'. The inlet manifold is connected to the inlet nozzle of the first unit. The first exhaust manifold is connected to the first outlet of the first electrolytic treatment unit and the second exhaust manifold is connected to the second outlet of the first electrolytic treatment unit. The second electrolytic treatment unit is identical to the first unit and is connected to the inlet manifold, the first exhaust manifold, and the second exhaust manifold in parallel to the first electrolytic treatment unit. As many units as desired can be connected to the manifolds in parallel. The units are powered by power supply 236'. Preferably, the system further includes means 360' forming a flow path connecting the first exhaust manifold and the second exhaust manifold. The means is different from that shown in FIG. 5.

In the system shown, a filter pod or solids separator 302' is used to reduce the amounts of solids contained in the water to be treated. Sensors measure flow, total dissolved solids, temperature and pH of the stream to be treated. The water is divided by header 350' and treated in treatment units 301', 302'. Treated water is collected by outlet manifolds 352', 354' and recombined. The treated water is passed through finishing filter 318' and is withdrawn from the unit ready for consumption by livestock or other use such as horticulture, household or industrial use.

Another embodiment of the invention provides a method for adjusting the pH of water. The method comprises providing a feed water stream at a first pH comprising dissolved minerals, flowing the feed water stream into a lower part of a casing. The casing carries a baffle, a first plate bundle, and a second plate bundle. The baffle separates the casing into a first compartment and a second compartment. The first plate bundle comprises a plurality of parallel spaced-apart plates positioned in the first compartment and the second plate bundle comprises a plurality of parallel spaced-apart plates positioned in the second compartment. A cathode is electrically connected to the plates of the first plate bundle, and an anode is electrically connected to the plates of the second plate bundle. The casing has a first outlet to withdraw treated water from the first compartment and a second outlet to withdraw treated water from the second compartment. A first portion of the feed water is flowed across the plates of the first plate bundle and the first portion of water is withdrawn from the first outlet. A second portion of the feed water is flowed across the plates of the second plate bundle and withdrawing the second portion of the feed water is withdrawn from the second outlet. An electric current from the cathode to the anode to adjust the pH of the first portion and the second portion of the feed water.

Generally speaking, the feed water stream has a first pH, the stream that has been withdrawn from the first outlet has a second pH that is higher than the first pH, and the stream that has been withdrawn from the second outlet has a third pH that is lower than the first pH.

In one embodiment of the invention, the stream that has been withdrawn from the first outlet is combined with the stream that has been withdrawn from the second outlet to produce a treated water stream that has a pH that is higher than the first pH.

In another embodiment of the invention, only a portion of the stream that has been withdrawn from the second outlet is combined with the stream that has been withdrawn from the first outlet to produce a treated water stream that has a pH that is higher than the first pH.

The design allows the separation of alkaline (for example, pH about 10.5) and acidic (or example, pH about 5.5) streams of water and permits the separated streams to be recombined in whole or in part, (for example, to produce an alkaline stream of pH of between about 8.8 and 10.5) The alkaline stream can be used for watering livestock and the acidic stream can be used for washing down milking areas in order to eliminate bacteria without the use of chemical or steam. The acidic stream can also be used in limited amounts to reduce the pH of the alkaline stream to optimize pH for consumption by livestock or for other purposes. The large water flows provided by the design have applications outside of the livestock environment. For example, the alkaline water can be used by retailers to wash down wet produce and the acidic water can be used by the packing industry to wash down meat, fish and poultry work and storage areas.

Typically, the alkaline water flow is larger than the acidic water flow. To keep the plates reasonably clear of deposits (for example, calcium-containing deposits on the side of the unit producing the alkaline stream) the charge on the plates can be reversed (for example, from 2-4 minutes out of every 40-50 minutes of normal operation) to cause the deposits to be released.

The treated water preferably has a pH that is at least one point higher than the untreated water, preferably at least 1.5 points higher than the untreated water. The treated water preferably has a pH of at least 8 and the treated water is microclustered in units averaging in the range of 5 to 7 molecules. Generally speaking, the water to be treated will have a first pH in the range of about 6 to about 7.7 and the treated water has pH is in the range of about 7.8 to about 9.8, preferably in the range of about 7.8 to about 8.8. The treated water will preferably have a negative oxidation-reduction potential (mV) of −600 (−ORP) or more negative. By producing two streams of treated water, pH can be optimized by blending. For dairy cattle, the treated water streams can be used as previously described.

While certain preferred embodiments of the invention have been described herein, the invention is not to be construed as being so limited, except to the extent that such limitations are found in the claims.

What is claimed is:

1. An electrolytic treatment system, said system including a first electrolytic treatment unit comprising
   a casing,
   a baffle separating the casing into a first compartment and a second compartment,
   a first plate bundle comprising a plurality of parallel spaced-apart plates positioned in the first compartment,
   a second plate bundle comprising a plurality of parallel spaced-apart plates positioned in the second compartment,
   a cathode electrically connected to the plates of the first plate bundle,
   an anode electrically connected to the plates of the second plate bundle,
   an inlet to supply water to be treated to the first compartment and the second compartment,
   a first outlet to withdraw treated water from the first compartment, and
   a second outlet to withdraw treated water from the second compartment,
   an inlet manifold connected to an inlet nozzle,
   a first exhaust manifold connected to the first outlet,
   a second exhaust manifold connected to the second outlet, and
   a second electrolytic treatment unit connected to the inlet manifold, the first exhaust manifold, and the second exhaust manifold in parallel to the first electrolytic treatment unit,
   said second electrolytic treatment unit comprising
   a casing,
   a baffle separating the casing into a first compartment and a second compartment,
   a first plate bundle comprising a plurality of parallel spaced-apart plates positioned in the first compartment,
   a second plate bundle comprising a plurality of parallel spaced-apart plates positioned in the second compartment,
   a cathode electrically connected to the plates of the first plate bundle,
   an anode electrically connected to the plates of the second plate bundle,
   an inlet to supply water to be treated to the first compartment and the second compartment,
   a first outlet to withdraw treated water from the first compartment, and
   a second outlet to withdraw treated water from the second compartment.

2. An electrolytic treatment system as in claim 1 wherein the parallel plates in each first plate bundle have platinum or titanium surfaces and the parallel plates in each second plate bundle have titanium, iron or aluminum surfaces.

3. An electrolytic treatment system as in claim 1 wherein the parallel plates in each first plate bundle have platinum surfaces and the parallel plates in each second plate bundle have titanium surfaces.

4. An electrolytic treatment system as in claim 1 wherein the plates are vertically positioned, wherein the plates are spaced in the range of 1 cm to 10 cm apart,
   wherein each plate bundle comprises in the range of 3 to 15 plates, wherein the plates are rectangularly shaped, wherein the inlet is in a lower part of the casing, and wherein the first and second outlets are in the top of the casing.

5. An electrolytic treatment system as in claim 1 further comprising means forming a fluid flow path connecting the first exhaust manifold and the second exhaust manifold to permit fluid carried by the second exhaust manifold to be combined with fluid carried by the first exhaust manifold.

* * * * *